No. 613,287. Patented Nov. 1, 1898.
S. H. LORING.
DOUGH KNEADER.
(Application filed Apr. 5, 1898.)
(No Model.)
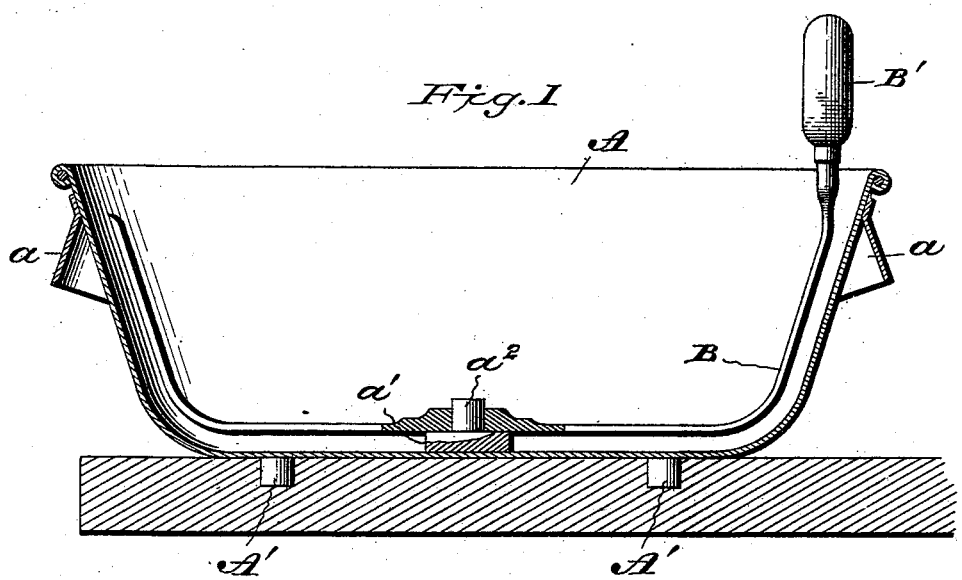
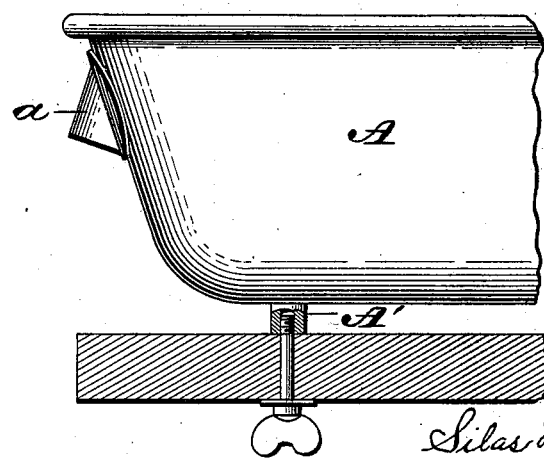
Witnesses:
L. S. Elliott.
H. H. Johnson.
Inventor:
Silas H. Loring,
by Eugene H. Johnson,
Attorney.

UNITED STATES PATENT OFFICE.

SILAS H. LORING, OF HOLDEN, MASSACHUSETTS.

DOUGH-KNEADER.

SPECIFICATION forming part of Letters Patent No. 613,287, dated November 1, 1898.

Application filed April 5, 1898. Serial No. 676,509. (No model.)

*To all whom it may concern:*

Be it known that I, SILAS H. LORING, a citizen of the United States, residing at Holden, in the county of Worcester and State of Massachusetts, have invented new and useful Improvements in Dough-Kneaders, of which the following is a specification.

This invention relates to certain new and useful improvements in dough-kneaders, the object of my improvement being to provide a cheap, simple, and effective device for kneading dough or mixing such ingredients as may be needed for culinary or domestic purposes.

In the accompanying drawings, which illustrate my invention, Figure 1 is a sectional view of a dough-kneader or mixer constructed in accordance with my improvement. Fig. 2 is a plan view of the mixing-blade detached. Fig. 3 is a side elevation, partly in section, of a modification showing a different manner of attaching the pan to a table or support.

A refers to a pan or receptacle having inclined side walls which join the bottom by a curved portion to avoid abrupt angles. The pan is provided with handles $a$ of the usual type. To the bottom of the pan, so as to project downward, are rigidly-secured lugs $A'$, and to the center of the pan, so as to project upward, is rigidly secured a stub-pivot $a^2$, the lower portion of which has a base $a'$, which provides adjacent to the pivot a flange upon which the mixing-blade will bear. The pan hereinbefore described is adapted to be placed upon a table or support which is provided with apertures or recesses to receive the lugs $A'$, the design being to hold the pan in rigid engagement with the support. Instead of providing the table-top with apertures the lugs $A'$ may be internally threaded, and in such instance the table or support will have holes therethrough for the passage of bolts, as shown in Fig. 3.

B refers to the mixing-blade, which is shaped to correspond with the internal configuration of the pan or receptacle A and in practice will set away from the wall of the pan or receptacle about a quarter of an inch, though in large pans this distance or space may be increased to half an inch. It is obvious that when the blade is turned upon a central stub-pivot the edges and sides will act upon the dough or material to be mixed, so that the blade on one side of the pivot will throw the dough inward or toward the center, while the other blade throws it in an opposite direction or toward the sides of the pan. The blade B is reinforced or thickened at its center, so as to provide a wide bearing-surface upon the pivot, and said blade may be of resilient material, so that it may give slightly in operation. One end of the blade is reduced or shaped so as to provide a shank for the attachment of a handle $B'$, said handle being disposed in the same vertical plane as the pivot, and said handle projects above the rim of the pan, as shown.

In operation the action of the mixing-blade upon the dough is similar to the movement given to the dough when manually worked upon a molding-board, and the dough is turned over and over, thoroughly kneading it without touching it with the hands. The motion is radically different from the motion imparted by a mixer having a blade which is turned or rotated on a center which is at an angle with the bottom of the pan rather than parallel therewith, as such a device beats the dough rather than kneads it.

I am also aware that it is not broadly new to provide a hopper-like vessel with a kneading-bar for use in making bread; but such a device is intended to mix the dough by forcing it against the sides of the vessel. With my improvement the dough is turned and is constantly moved so as to bring a different portion thereof under the influence of the mixing-blade.

Having thus described my invention, what I claim as new, and desire to secure by Letters Patent, is—

1. In a dough-mixer, the combination with a pan or receptacle having an upwardly-projecting and centrally-located stub-pivot with a flange positioned above the bottom of the vessel, in combination with a mixing-blade having a central aperture through which the stub-pivot is passed, said blade being bent so as to be parallel with the sides and bottom of the pan or receptacle, and a handle for turning said mixing-blade upon its stub-pivot, substantially as shown.

2. The improved dough-mixer herein described consisting of a pan or receptacle having attached to the bottom downward-projecting lugs and centrally thereto an upward-projecting stub-pivot having a flange positioned above the bottom of the vessel, a mixing-blade bent to conform to the internal configuration of the pan and provided with a central aperture surrounded by a wall of increased thickness, and a handle, substantially as shown.

In testimony whereof I have hereunto set my hand in presence of two subscribing witnesses.

SILAS H. LORING.

Witnesses:
   E. HELEN JOHNSON,
   NELLIE W. COOK.